United States Patent
Carlson et al.

(10) Patent No.: US 9,396,217 B2
(45) Date of Patent: *Jul. 19, 2016

(54) MONITORING AND DEBUGGING QUERY EXECUTION OBJECTS

(71) Applicant: International Business Machines Corporation, Armonk, NY (US)

(72) Inventors: David G. Carlson, Rochester, MN (US); Steven V. Hoeschen, Rochester, MN (US); Kevin J. Kathmann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 172 days.

This patent is subject to a terminal disclaimer.

(21) Appl. No.: 13/788,791

(22) Filed: Mar. 7, 2013

(65) Prior Publication Data

US 2013/0185661 A1 Jul. 18, 2013

Related U.S. Application Data

(63) Continuation of application No. 12/038,446, filed on Feb. 27, 2008, which is a continuation of application No. 11/282,030, filed on Nov. 17, 2005, now Pat. No. 9,092,464.

(51) Int. Cl.
*G06F 17/30* (2006.01)
*G06F 3/048* (2013.01)

(52) U.S. Cl.
CPC .......... *G06F 17/30289* (2013.01); *G06F 3/048* (2013.01); *G06F 17/30483* (2013.01)

(58) Field of Classification Search
CPC ............. G06F 17/30864; G06F 17/30867; G06F 17/30067; G06F 3/048; G06F 17/30289; G06F 17/30483
USPC .......................................................... 707/705
See application file for complete search history.

(56) References Cited

U.S. PATENT DOCUMENTS

| 5,748,881 | A | * | 5/1998 | Lewis | G06F 11/3466 345/619 |
| 6,052,694 | A | * | 4/2000 | Bromberg | 707/999.2 |
| 6,141,699 | A | | 10/2000 | Luzzi et al. | |
| 6,477,527 | B2 | * | 11/2002 | Carey | G06F 17/3041 707/999.004 |

(Continued)

OTHER PUBLICATIONS

Daniel J. Abadi et al., "Aurora: A New Model and Architecture for Data Stream Management", 2003, VLDB Journal 12, pp. 120-139.*

(Continued)

*Primary Examiner* — Scott A Waldron
(74) *Attorney, Agent, or Firm* — Martin & Associates, LLC; Derek P. Martin (57) ABSTRACT

Nodes in a query execution data structure have monitor and dump methods defined. The monitor method enables the collection of information from the node. The dump method outputs the monitored information from each node. A monitor and debug mechanism of the preferred embodiments includes a graphical user interface that allows a user to graphically examine a query execution tree, to enable monitoring of the nodes on a node-by-node basis, and to view information dumped from the query execution data structure as the query is executed or after the query is executed. The result is a powerful tool that allows efficiently monitoring and debugging a query implemented in an object oriented query execution data structure.

2 Claims, 10 Drawing Sheets

(56) References Cited

U.S. PATENT DOCUMENTS

| | | |
|---|---|---|
| 6,910,032 B2 | 6/2005 | Carlson et al. |
| 6,944,614 B1* | 9/2005 | Ramasamy et al. ... 707/999.004 |
| 7,234,112 B1 | 6/2007 | Brown et al. |
| 7,532,086 B2 | 5/2009 | Ju et al. |
| 7,599,923 B2 | 10/2009 | Brown et al. |
| 2002/0143755 A1* | 10/2002 | Wynblatt et al. ............ 707/3 |
| 2003/0217345 A1* | 11/2003 | Rajsuman et al. ............ 716/6 |
| 2003/0229627 A1* | 12/2003 | Carlson et al. ............... 707/3 |
| 2004/0010716 A1* | 1/2004 | Childress et al. .......... 713/201 |
| 2004/0039942 A1* | 2/2004 | Cooper et al. ............. 713/201 |
| 2004/0103315 A1 | 5/2004 | Cooper et al. |
| 2005/0010880 A1 | 1/2005 | Schubert et al. |
| 2005/0216248 A1* | 9/2005 | Ciolfi et al. ................. 703/22 |
| 2006/0282695 A1* | 12/2006 | Mital et al. ................. 713/502 |

OTHER PUBLICATIONS

Tore Risch, "Monitoring Database Objects", 1989, Proceedings of the 15th International Conference on Very Large Data Bases, pp. 445-454.*

* cited by examiner

Select * from MYFILE1, MYFILE2

| Data for Scan Node 2 | _ □ X |

| | | |
|---|---|---|
| Node Type | Scan | 910 |
| Number Processed | 383 | 920 |
| Node ID | 2 | 930 |

| | | | | | 1010 |
|---|---|---|---|---|---|
| Monitor State | 1 | Total Cycles | 65557 | Running Time | 0.000104 |
| Monitor Cycles | 0 | Node Cycles | 65557 | Node CPU Time | 0.000096 |
| | | | | Total Time | 0.000194 |

Method Counters 1020

| | |
|---|---|
| Open | 0 |
| Close | 0 |
| Position Before Start | 0 |
| Position After End | 0 |
| Position Before RRN | 0 |
| Position After RRN | 0 |
| Position Next RRN | 0 |
| Position Previous RRN | 0 |
| Position By Key | 0 |
| Position Next and Execute | 7 |
| Position Previous and Execute | 0 |
| Prepare for Validate | 18 |
| Resume | 0 |
| Validate | 18 |
| Refresh | 0 |
| Cleanup | 0 |

I/O Counters 1030

| | |
|---|---|
| Sync DB Reads | 0 |
| Sync Non-DB Reads | 0 |
| Async DB Reads | 0 |
| Async Non-DB Reads | 0 |
| I/O Pending Waits | 0 |
| Sync I/O Waits | 0 |
| Page Faults | 0 |

( Change Monitor State ) 940  ( Display Resource ) 950  ( Display AOL ) 960

MONITORING AND DEBUGGING QUERY EXECUTION OBJECTS

CROSS-REFERENCE TO PARENT APPLICATION

This patent application is a continuation of U.S. Ser. No. 12/038,446, filed on Feb. 27, 2008, which is incorporated herein by reference.

BACKGROUND OF THE INVENTION

1. Technical Field

This invention generally relates to computer systems, and more specifically relates to database apparatus and methods.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records are returned as the query result. Structured Query Language (SQL) is one specific query language that may be used to query a database.

U.S. Pat. No. 6,915,291 entitled "Object-Oriented Query Execution Data Structure", issued on Jul. 5, 2005, discloses an object oriented data structure that includes a plurality of node objects arranged in a tree relationship to define a query. The nodes include both data and code that allow the query to be executed. The result is a query architecture that is significantly extendible and adaptable.

One potential problem with the query execution data structure in U.S. Pat. No. 6,915,291 is the complexity of the data structure for complicated queries. The resulting data structure can have hundreds or even thousands of nodes. A query of this complexity becomes very difficult to debug. Debugging queries is important for two primary reasons. The first is to check the logic of the query itself, to make sure the query is properly defined. The second is to check the run-time performance of the query.

Statement level debuggers are known in the art, and have been used to debug queries. The problem with a statement level debugger is that a breakpoint is typically set when a particular object is executed. Note, however, that a given object type may appear in a query execution data structure at a number of different locations, each executing the same implementation methods, but potentially only one of these objects is actually contributing to the problem being debugged. For example, if a query execution data structure has ten instances of an object, and a breakpoint is set to break execution when that object type is executed, the debugger will break execution each time any of the ten instances of the object are executed, even though most of the instances may not contribute to the problem. The result is a debugger that breaks an excessive number of times.

Current debuggers do not have the capability of executing a query execution object to the point of failure, and halting execution at the proper place and time in the code, even using elaborate debugger macros. As a result, it is very difficult, if not impossible, to debug a complex query execution data structure that includes many query execution objects using known statement level debuggers. Without a way to debug query execution data structures, the prior art will continue to suffer from inefficient ways of debugging queries.

DISCLOSURE OF INVENTION

According to the preferred embodiments, nodes in a query execution data structure have monitor and dump methods defined. The monitor method enables the collection of information from the node. The dump method outputs the monitored information from each node. A monitor and debug mechanism of the preferred embodiments includes a graphical user interface that allows a user to graphically examine a query execution tree, to enable monitoring of the nodes on a node-by-node basis, and to view information dumped from the query execution data structure as the query is executed or after the query is executed. The result is a powerful tool that allows efficiently monitoring and debugging a query implemented in an object oriented query execution data structure.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The preferred embodiments provide an efficient way to monitor a query execution data structure as it executes, which allows for debugging a query corresponding to the query execution data structure. Each node in the query execution data structure includes a monitor( ) method that enables collection of monitored data, and a dump( ) method that outputs the monitored data. A debug and monitor mechanism receives the monitored data, and displays information corresponding to the monitored data in a graphical user interface. The debug and monitor mechanism allows monitoring and debugging a query as the query executes, thereby allowing a powerful tool for real-time monitoring and debugging.

Figure 1:
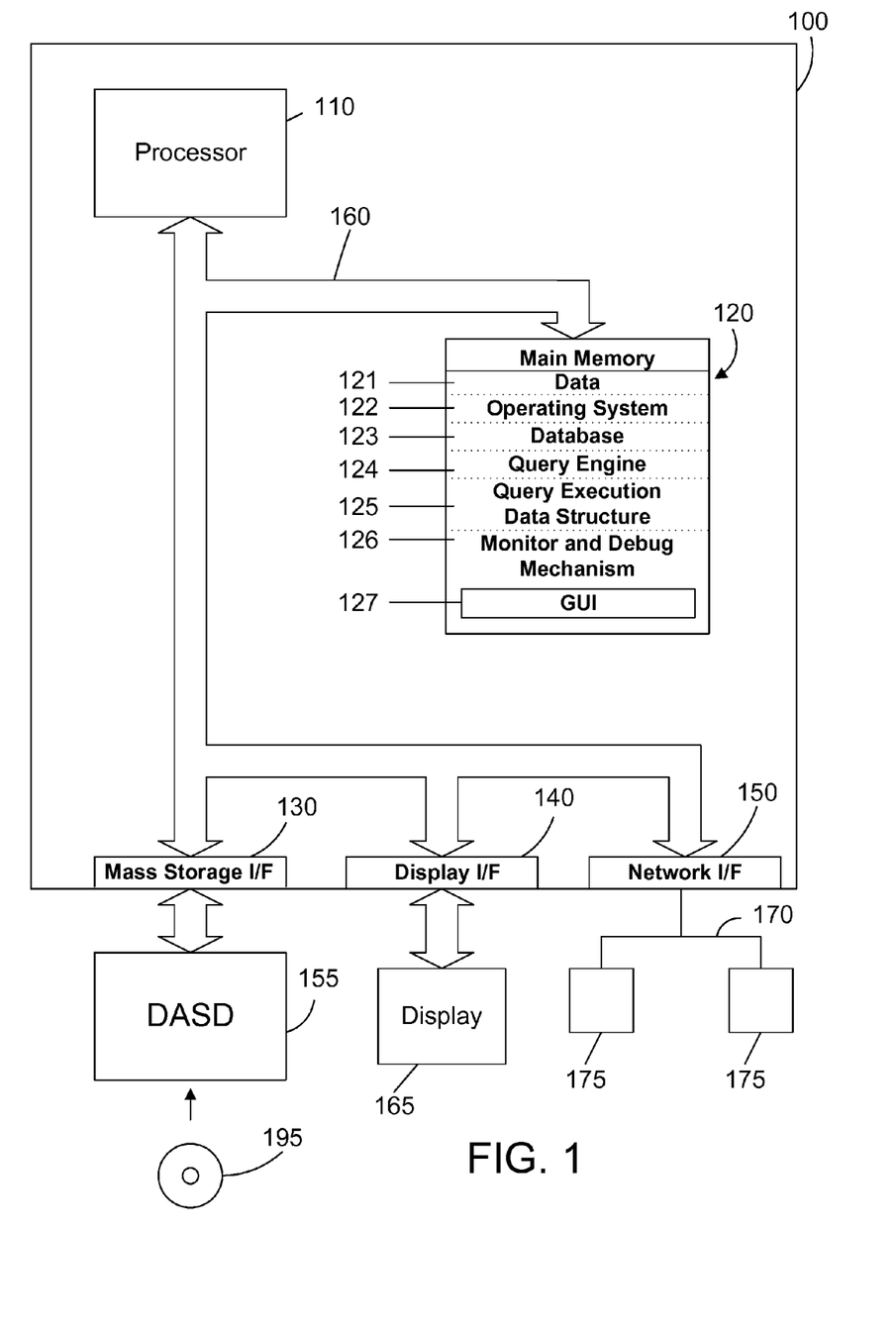
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a database 123, a query engine 124, a query execution data structure 125, and a monitor and debug mechanism 126. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. Database 123 is any suitable database, whether currently known or developed in the future. Database 123 preferably includes one or more tables. Query engine 124 processes queries to database 123 in the form of query execution data structure 125. The query execution data structure 125 is an object oriented data structure representative of a database query. The query execution data structure 125 has the basic form shown in U.S. Pat. No. 6,915,291, but with additional methods shown in FIG. 2 and described below that allow monitoring the objects in the query execution data structure and dumping the monitored data. The monitor and debug mechanism 126 receives monitored data from the query execution data structure 125, and displays information corresponding to the monitored data in a graphical user interface 127 to a user. In this manner, a user can use the monitor and debug mechanism 126 to efficiently monitor and debug the query defined by the query execution data structure 125 using a graphical tool. While monitor and debug mechanism 126 and graphical user interface 127 are shown in FIG. 1 on the same computer system as the query engine 124 and query execution data structure 125, the preferred embodiments extend to a networked computer system where the monitor and debug mechanism 126 and graphical user interface 127 are on a separate computer system coupled via network to computer system 100.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, query engine 124, query execution data structure 125, and monitor and debug mechanism 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170.

TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links. Note that the preferred signal bearing media is tangible.

Figure 2:
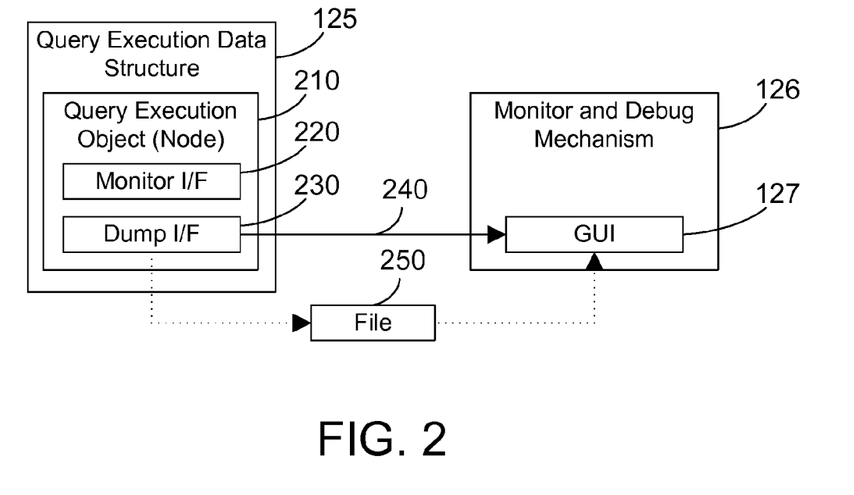
FIG. 2 is a block diagram showing details of the query execution data structure in FIG. 1 and how it communicates with the monitor and debug mechanism.

Referring to FIG. 2, a query execution data structure 125 of the preferred embodiments preferably includes a plurality of nodes, with each node comprising a query execution object 210. Each node is preferably similar to the nodes in the query execution data structure disclosed in U.S. Pat. No. 6,915,291, except one or more of the nodes may include a monitor interface 220 and a dump interface 230. The monitor interface 220 is preferably an object oriented method that allows enabling and disabling the collection of extended monitored data from the node. Note that the presence of the monitor interface 220 provides storage for the monitored data, and allows collection of a minimal set of monitored data even when monitoring of the node is disabled. Thus, when monitoring of a node is disabled, e.g., by invoking monitor(off), the minimal set of monitored data will still be collected. When monitoring of a node is enabled, e.g., by invoking monitor (on), a larger set of monitored data is collected. The dump interface 230 is preferably an object oriented method that allows dumping the monitored data. Note that the monitored data may be received by the monitor and debug mechanism 126 in different ways. For example, a connection (e.g., socket) could be established between the dump interface 230 and the graphical user interface 127 in the monitor and debug mechanism 126. As a result, the monitored data may be transmitted in a data stream 240 directly between the dump interface and the GUI 127. In the alternative, the dump interface 230 may write the monitored data to a file 250, which can then be read by the GUI 127, as shown by the dotted lines in FIG. 2. Note that the data stream 240 and file 250 may have any suitable format. One format for the data stream 240 within the scope of the preferred embodiments uses an XML data stream, which is self-describing to the recipient.

Figures 3, 4:
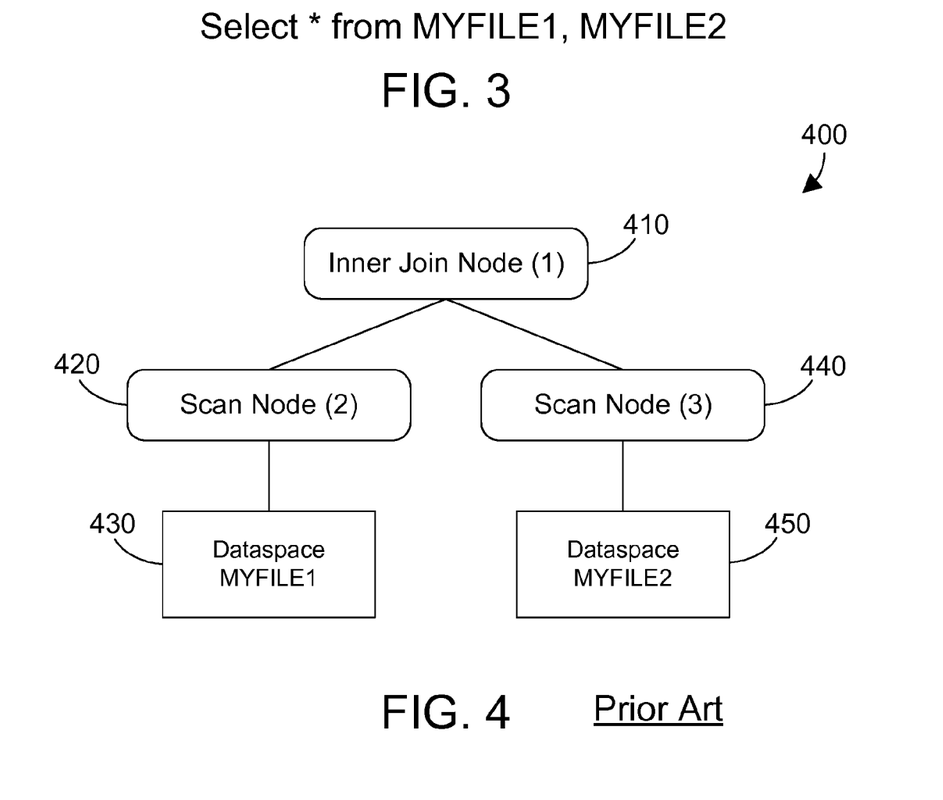
FIG. 3 is a sample query for illustrating the concepts of the preferred embodiments.
FIG. 4 is a prior art query execution data structure for the query in FIG. 3.

Referring to FIG. 3, a sample query is shown to illustrate the concepts of the preferred embodiments. The sample query selects all records from two different files, MYFILE1 and MYFILE2. While this is a simple and somewhat contrived query, it is useful to illustrate the concepts of the preferred embodiments.

FIG. 4 shows a query tree 400 that is representative of a query execution data structure as defined in U.S. Pat. No. 6,915,291 for the query in FIG. 3. A first scan node 420 interrogates MYFILE1 430, a second scan node 440 interrogates MYFILE2 450, and the results from the scan nodes 420, 440 are joined by an inner join node 410. While one can appreciate the simplicity of the query tree for this very simple sample query, one can also appreciate that a query of any complexity can result in a query tree that is very complex, and hence difficult to debug. The preferred embodiments provide a simple way to monitor and debug a query execution data structure.

Figure 5:
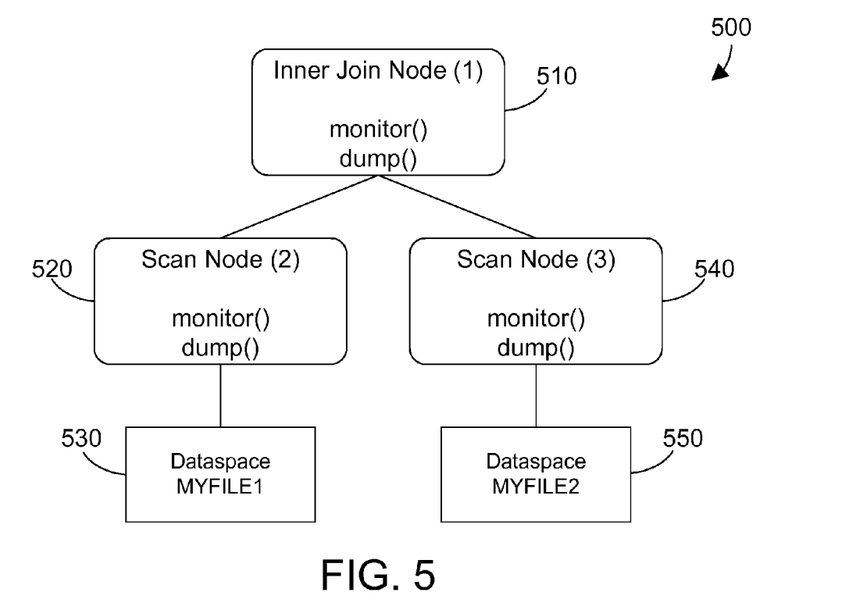
FIG. 5 is a query execution data structure in accordance with the preferred embodiments for the query in FIG. 3.

Referring to FIG. 5, a query tree 500 in accordance with the preferred embodiments includes an inner join node 510 and scan nodes 520 and 540 that interrogate their respective dataspaces MYFILE1 530 and MYFILE2 550. Note that the query tree 500 has the same basic structure as the prior art query tree 400 in FIG. 4. A significant difference is the presence of the monitor( ) and dump( ) methods in nodes 510, 520 and 540 in FIG. 5 that are not present in FIG. 4. Note that the presence of the monitor( ) method assumes a minimal set of data is collected from a node even when monitoring is disabled. More extensive monitoring is enabled by invoking the monitor( ) method with one or more parameters that indicate enabling, such as monitor(on). In similar fashion, invoking monitor(off) will disable the more extensive monitoring for a node, but the minimal data will still be collected. Note that monitor( ) and dump( ) are virtual methods that must be implemented in each of the concrete subclasses. As a result, each monitor( ) method specifies in its implementation what extended data may be monitored. The monitor( ) methods on each node allow individually enabling the monitoring on a node-by-node basis.

The dump( ) method is invoked to read the monitored data from a node. If monitoring is disabled for a particular node, the dump( ) method will cause the minimal set of monitored data to be read. If monitoring is enabled for a particular node, the dump( ) method will cause the more extensive set of monitored data to be read. In short, the dump( ) method dumps out all of the monitored data, whether it be minimal (if monitoring is disabled) or more extensive (if monitoring is enabled). As shown in FIG. 2, the GUI 127 in the monitor and debug mechanism 126 may invoke the dump( ) methods 230 on the nodes, causing the nodes to dump their monitored data to the GUI 127. In this manner, the monitor( ) and dump( ) methods allow retrieving monitored data from the query execution data structure 125.

Figure 6:
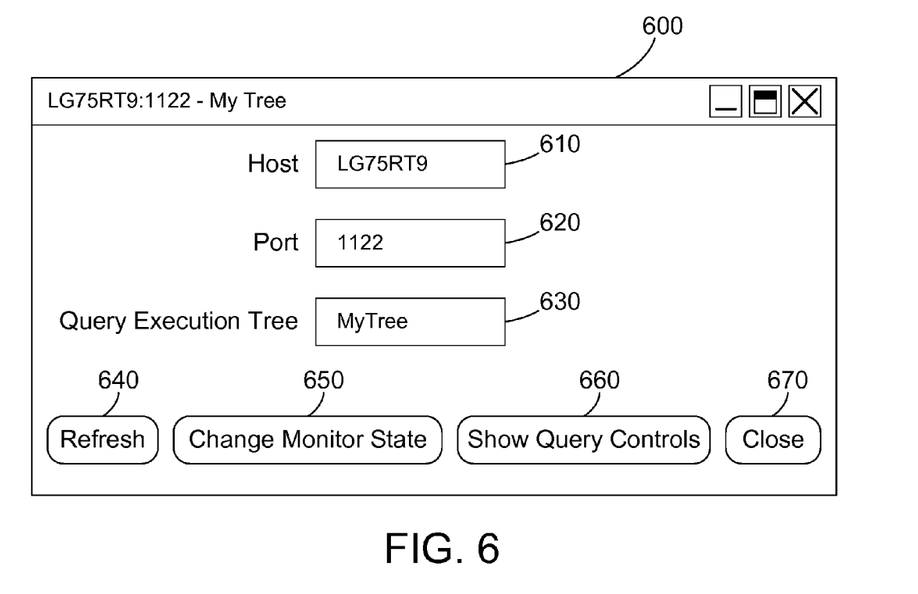
FIG. 6 is a display window showing operations that may be performed on a selected query execution tree in the graphical user interface in the monitor and debug mechanism shown in FIG. 1.
Figure 7:
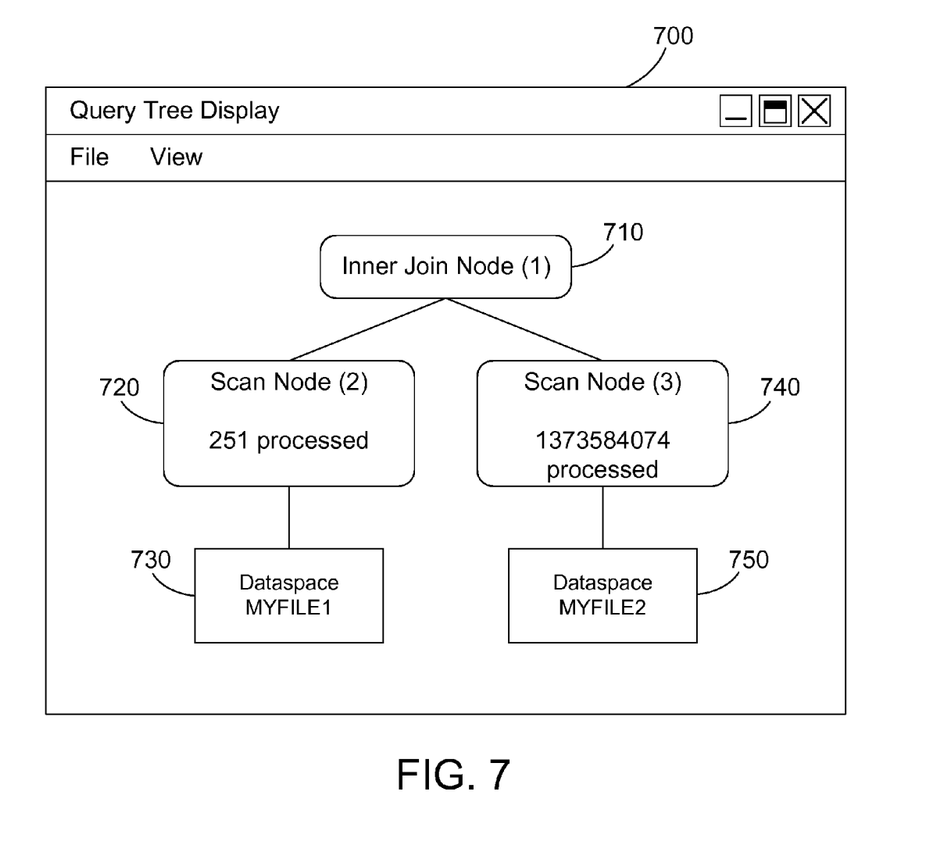
FIG. 7 is a display window showing a graphical display of a query tree as the query is being executed.

We now show several sample windows that could be displayed by the graphical user interface 127 in FIGS. 1 and 2 within the scope of the preferred embodiments. Referring to FIG. 6, a sample window 600 is displayed by the GUI 127 once a query execution tree has been identified and selected. The window 600 includes the specification of a host 610, a port 620, and the name of the selected query execution tree 630. A refresh button 640 may be selected by the user to either initially display a query tree, or to refresh an existing display of the query tree, thereby allowing the query tree to be viewed dynamically as a query is being executed. A change monitor state button 650 may be selected by the user to change the monitor state of a currently-selected node, e.g. from disabled to enabled. The show query controls button 660 is selected by the user to invoke a window that allows the user to specify conditions for the query that allow efficiently debugging the query. The close button 670 is selected by the user to close the window 600. We now assume the user selects the refresh button 640, which results in the display of the query tree display window 700 shown in FIG. 7.

The query tree display window 700 shows the query tree in a graphical format similar to that shown in FIG. 5. A first scan node 720 interrogates MYFILE1 730. A second scan node 740 interrogates MYFILE2 750. An inner join node 710 joins the results from the scan nodes 720 and 740. Note that the scan nodes include a count of the records that have been processed so far. Thus, scan node 720 shows 251 processed records, while scan node 740 shows 1,373,584,074 processed records. We assume for this example that MYFILE2 is very large, with several million records. As a result, it takes some time for the query to execute, thereby allowing the user to monitor the progress of the query as it executes. For example, clicking on the refresh button 640 in FIG. 6 a second time will result in the query tree display 700 in FIG. 8, which is the same display shown in FIG. 7, except the number of records processed in nodes 720 and 740 are higher values. This illustrates how the monitor and debug mechanism of the preferred embodiments can be used to monitor the progress of queries as the queries are being executed.

Figure 8:
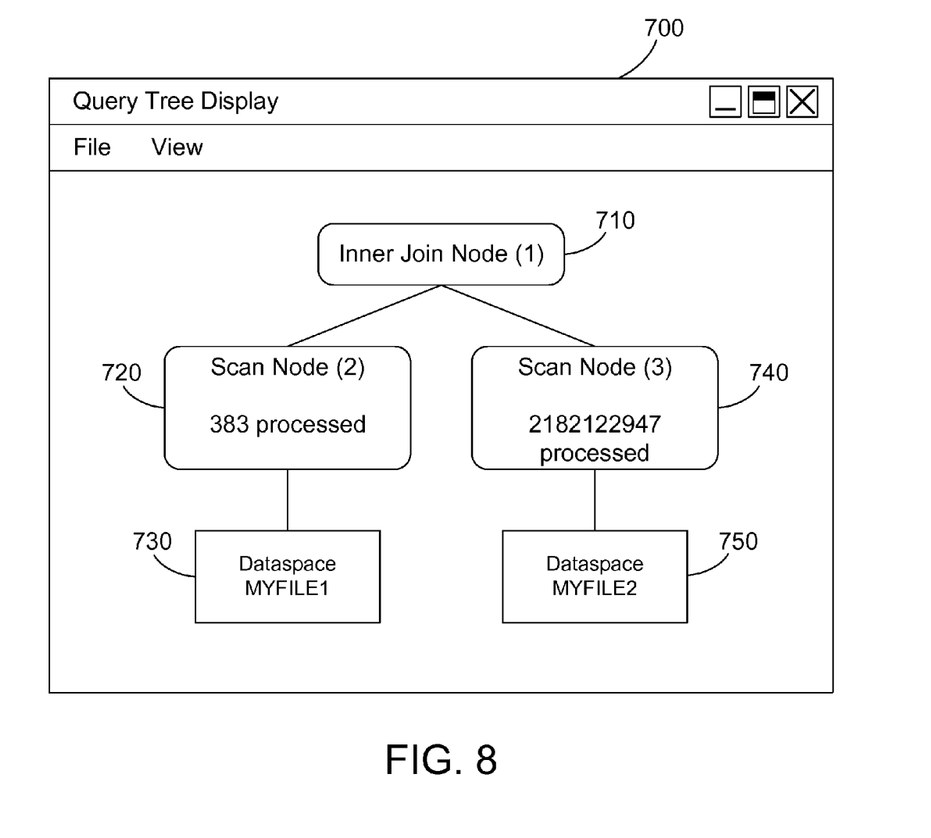
FIG. 8 is a display window showing a graphical display of a query tree after being refreshed as the query continues execution.
Figure 9:
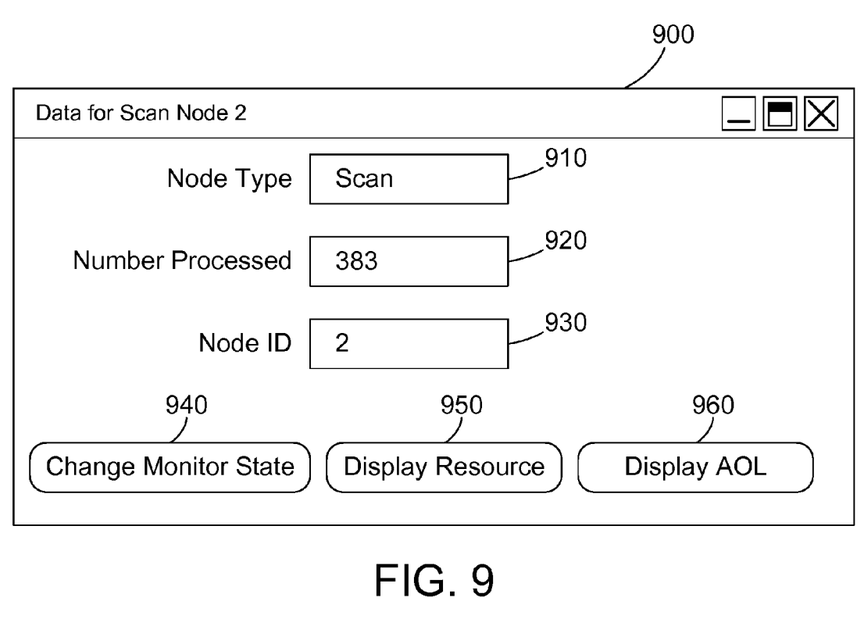
FIG. 9 is a display window showing data in a scan node and possible operations on the scan node in accordance with the preferred embodiments.
Figure 10:
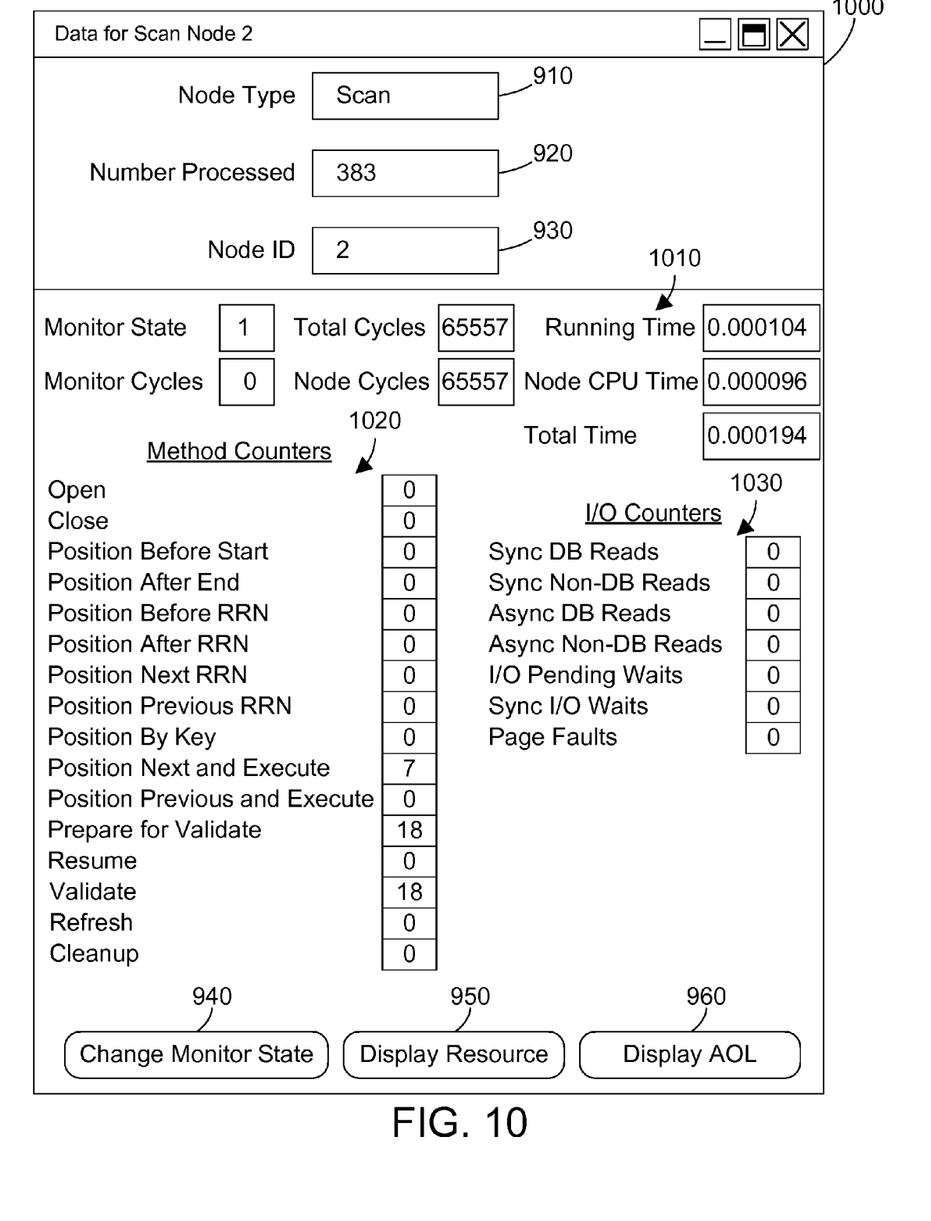
FIG. 10 is a display window showing the scan node in FIG. 9 after clicking on the change monitor state button t enable the collection of more extensive data.

We now assume the user double-clicks or otherwise selects the scan node 720 in FIG. 8. Selecting the scan node causes a new display window 900 to be displayed, as shown in FIG. 9. Note that this window 900 shows data for scan node 2, as shown in the title bar for window 900. The data includes the node type 910, the number of records processed 920, and the node ID 930. These three items of data 910, 920 and 930 make up the minimal data that is monitored, even when monitoring for this scan node is disabled. A more extensive set of data may be monitored by clicking on the change monitor status button 940 in FIG. 9, which causes the window 1000 in FIG. 10 to be displayed. Note that FIG. 10 includes the same top portion that includes 910, 920 and 930, and the same buttons 940, 950 and 960 at the bottom. The change is the ability to view many additional parameters, shown in FIG. 10 as 1010, 1020 and 1030. The additional monitored data at 1010 includes an indication of monitor state, a count of monitor cycles, a count of total cycles, a count of node cycles, a running time, node CPU time, and total time. The additional monitored data at 1020 includes method counters that show how many times each of the listed methods have been invoked. The additional monitored data at 1030 includes I/O counters that show how often different I/O operations are performed. The monitored data in window 1000 is the more extensive data that includes the minimal data in boxes 910, 920 and 930, and the more extensive data at 1010, 1020 and 1030.

Figure 11:
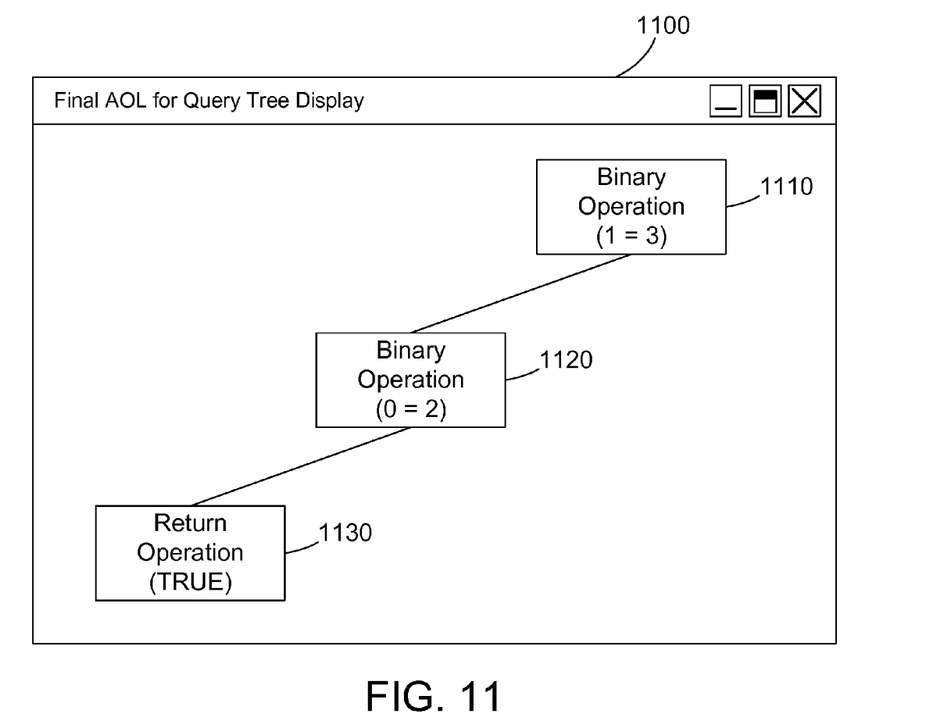
FIG. 11 is a display window showing the attribute operation list for the query tree display.

Referring back to FIG. 9, the display resources button 950 and display AOL button 960 allow displaying other features relating to the query execution data structure, including attribute descriptor vectors, attribute operation lists, etc. We assume the user has selected the entire query in the query tree display of FIG. 7, which displays a window similar to that shown in FIG. 9 for the entire tree, and then clicks on the display AOL button 960. The result is the display of the attribute operation list (AOL) for the query tree, as shown in window 1100 in FIG. 11. The AOL for the query tree includes binary operation nodes 1110 and 1120, and a return operation (TRUE) node 1130.

Figure 12:
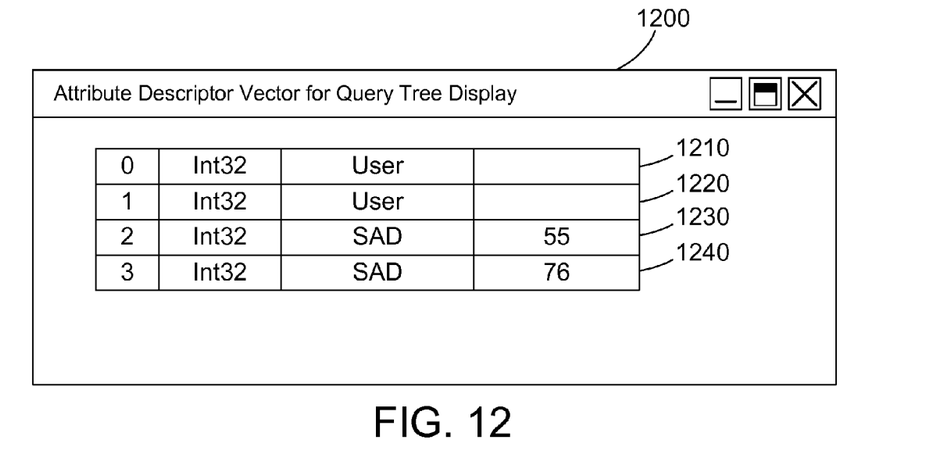
FIG. 12 is a display window showing an attribute descriptor vector for the query tree display.

We now assume a user clicks on the display resource button 950 in FIG. 9, which results in the display of an attribute descriptor vector for the query tree, as shown in window 1200 in FIG. 12. The attribute descriptor vector window 1200 includes a table with four entries, 0, 1, 2 and 3. The record 1210 that corresponds to the first record (record 0) has a data type of a 32 bit integer for a User. The record 1220 that corresponds to the second record (record 1) has a data type of a 32 bit integer for a User. The record 1230 that corresponds to the third record (record 2) has a data type of a 32 bit integer for a Set Attribute Descriptor (SAD). The record 1240 that corresponds to the fourth record (record 3) has a data type of a 32 bit integer for a SAD. The values 55 and 76 shown for records 1230 and 1240, respectively, correspond to the values in tables MYFILE1 and MYFILE2, respectively, at the time the attribute descriptor vector is displayed in window 1200.

Figure 13:
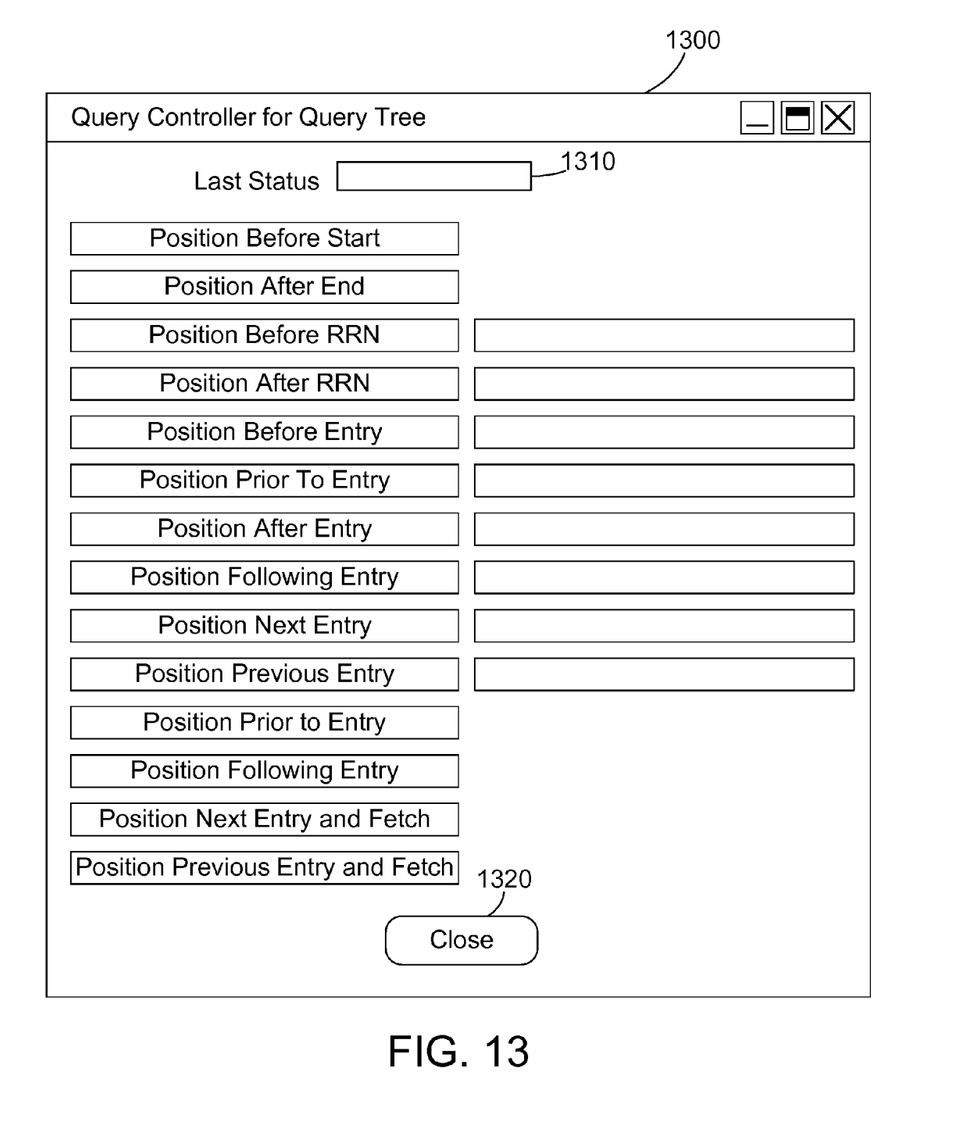
FIG. 13 is a display window showing a query controller window for controlling the execution of the query defined by the query execution tree.

We now assume the user is again viewing the display 600 in FIG. 6, and then clicks on the show query controls button 660. As a result, the window 1300 in FIG. 13 is displayed to the user. Note that display 1300 includes a field 1310 that indicates the last status for the query tree, and a close button 1320 for closing the window 1300. The last status field 1310 shows whether the last operation succeeded or failed, and may include text that states "success" or "fail", or may include a numerical or alphanumeric code to indicate specifically what happened. The buttons on the left side of window 1300 may each be individually selected. The query controller window 1300 allows a user to perform operations while a query tree is being executed. The fields on the right side of window 1300 allow the user to input parameters for the corresponding buttons on the left. In this manner, a query execution tree may be executing, and the query controller window 1300 allows the user to gain manual control of the query tree, and to interactively click on buttons that perform functions that help the user to evaluate the performance of the query.

Figure 14:
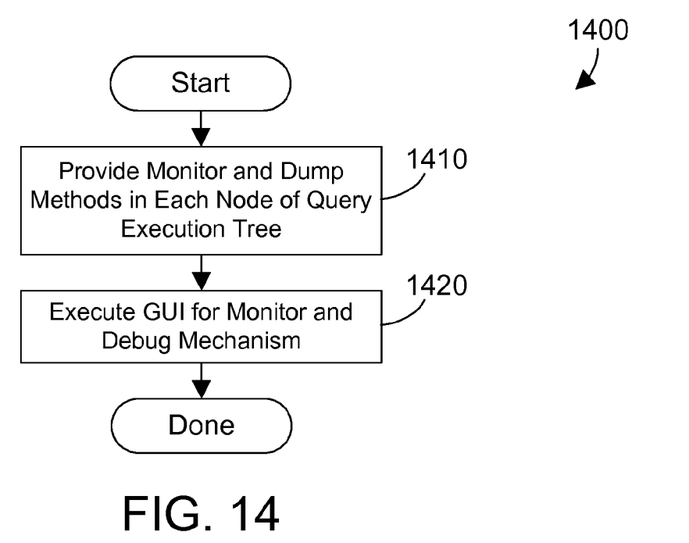
FIG. 14 is a flow diagram of a method in accordance with the preferred embodiments.

Referring to FIG. 14, a method 1400 in accordance with the preferred embodiments starts by providing monitor and dump methods in each node of a query execution tree (step 1410). In the most preferred implementation, the monitor and dump methods are provided in each and every node in the query execution tree, as shown in step 1410. Note, however, that it is equally within the scope of the preferred embodiments that only a subset of the nodes will have monitor( ) and debug( ) methods. A graphical user interface in the monitor and debug mechanism is then executed (step 1420). The GUI receives the monitored data from the nodes in the query execution tree, then displays information corresponding to the monitored data to the user.

Figure 15:
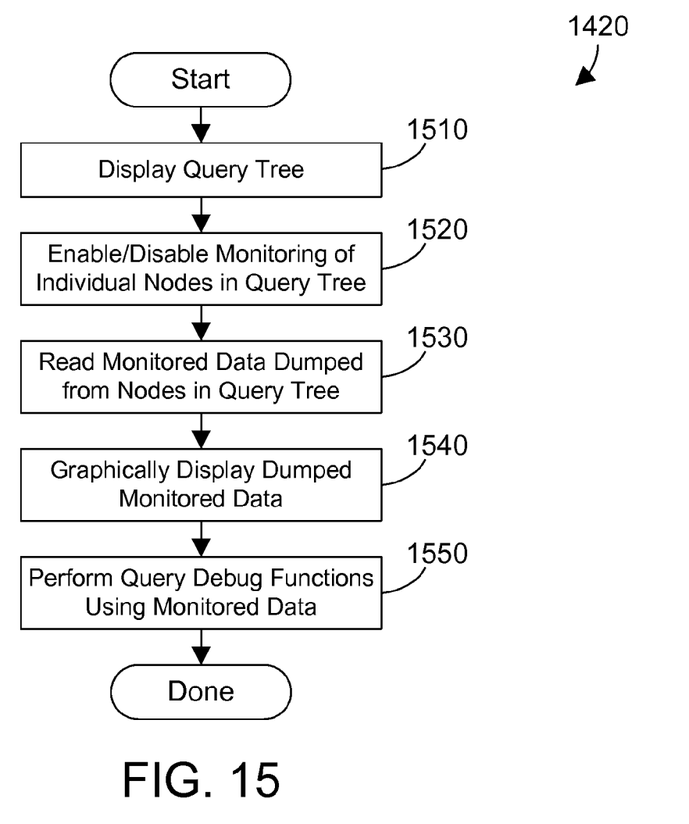
FIG. 15 is a flow diagram of one specific implementation of step 1420 in FIG. 14 in accordance with the preferred embodiments.

Referring to FIG. 15, a method 1420 represents one suitable implementation for step 1420 of FIG. 14 within the scope of the preferred embodiments. Method 1420 begins by displaying the query tree (step 1510). The monitoring of individual nodes in the tree may be enabled or disabled (step 1520). The monitored data is then read from nodes in the query tree (step 1530), preferably by the GUI invoking the dump( ) methods on the nodes in the query tree. The monitored data dumped from the nodes is then graphically displayed to the user (step 1540). In addition, query debug functions may be performed using the monitored data (step 1550). Note that the preferred embodiments expressly extend to other uses of the monitored data that are not shown in FIG. 15.

The preferred embodiments significantly improve the power of the query execution data structure disclosed in U.S. Pat. No. 6,915,291 by adding monitor and dump methods on one or more nodes in the query execution data structure. The monitor and dump methods enable the gathering and output of monitored data to a monitor and debug mechanism, which can then display corresponding information in a GUI to a user. The result is a powerful tool for monitoring and debugging even complex queries that may have hundreds or thousands of nodes in their corresponding query execution data structures.

While the tool may be used to perform real-time monitoring of queries as they execute, many queries will not take enough time to execute for a user to monitor the query in real-time as it executes. In such a case, the debug and monitor mechanism is useful as a post-processing tool to examine the state of the query objects after query execution is complete. In addition, the monitor and debug mechanism of the preferred embodiments may specify a breakpoint for a particular node that allows running the query to the point where the breakpoint is encountered, then halting execution of the query for analysis using the monitor and debug mechanism.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. A computer-implemented method for displaying information regarding a query to a user in a graphical user interface, the method comprising the steps of:

executing the query, wherein the query comprises an object oriented query execution data structure that comprises a plurality of object oriented nodes, wherein each node includes an object oriented monitor method that enables collection of monitored data from the node and an object oriented dump method that outputs the monitored data wherein a minimal set of data is collected by the node when monitoring is disabled and an extended set of data is collected by the node when monitoring is enabled, wherein enabling and disabling monitoring is performed by invoking the monitor method;

receiving the monitored data in a data stream from the object oriented query execution data structure as the query executes; and displaying to a user a graphical representation of the query execution data structure that allows the user to enable monitoring of the plurality of object oriented nodes on a node-by-node basis, to view information dumped from the query execution data structure as the query executes, and to perform query debug functions using the monitored data.

2. The method of claim 1 wherein the monitored data is written to a file, and the step of receiving the monitored data comprises the step of reading the file.

* * * * *